United States Patent
Gu (10) Patent No.: US 6,616,044 B1
(45) Date of Patent: Sep. 9, 2003

(54) METHODS AND APPARATUS FOR OBTAINING IMAGING INFORMATION IN BAR CODE SCANNERS

(75) Inventor: Yeming Gu, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/264,758

(22) Filed: Oct. 4, 2002

(51) Int. Cl.⁷ .................................................. G06K 7/10
(52) U.S. Cl. ............................. 235/462.14; 235/462.25
(58) Field of Search ...................... 235/462.14, 462.15, 235/462.25, 462.36, 462.01, 454; 356/300, 326, 392, 394

(56) References Cited

U.S. PATENT DOCUMENTS 5,446,272 A * 8/1995 Barkan ................. 235/462.01
5,767,497 A * 6/1998 Lei ........................... 235/462
5,889,270 A * 3/1999 Van haagen et al. .... 235/462.25
6,069,696 A * 5/2000 McQueen et al. .......... 235/383

* cited by examiner

Primary Examiner—Daniel St. Cyr
(74) Attorney, Agent, or Firm—Priest & Goldstein, PLLC

(57) ABSTRACT

Techniques for using a scan pattern to estimate imaging information for an object reflecting the scan pattern are described. As an object is brought within range of a scan window, a scan beam tracing out a scan pattern comprising a plurality of scan lines causes reflection of the scan beam back into the scan window to produce a scanner signal based on reflections of the scan beam. The time at which the scanner signal indicates the presence of an object is noted and this timing information is mapped to position information identifying the position of the scan beam. The timing and position information is used to estimate imaging information about the object, including position, size, shape and motion information.

17 Claims, 7 Drawing Sheets

METHODS AND APPARATUS FOR OBTAINING IMAGING INFORMATION IN BAR CODE SCANNERS

FIELD OF THE INVENTION

The present invention relates generally to improvements to bar code scanners. More particularly, the invention relates to advantageous techniques for generating a scanner signal based on reflected light from an object in a field of view of the scanner to scan product bar codes and also interpreting the scanner signal to compute imaging information relating to the size, shape, position and motion of an object or product in the scan field of the scanner.

BACKGROUND OF THE INVENTION

Bar code scanners are used in a wide variety of applications, such as retailing, inventory control, customer identification and many other applications. Many bar code scanners are adapted to scan a bar code located on an object, when the object is placed within the field of view of the scanner. Many such scanners produce complex scan patterns in order to maximize coverage of an object, so that a bar code located on an object will produce a readable reflection, even if the bar code is located on a relatively obscure area of an irregularly shaped object. The scan pattern is typically created when a scan beam traces out a series of scan lines. Each scan line results when the point at which the scan beam emerges from the scanner moves from one point to another.

A scan beam tracing out a scan pattern intercepts an object within the scan volume and produces a scanner signal when the scan beam strikes the object and the light from the scan pattern is reflected back into the scanner and detected. In typical prior art scanners, the signal's only components of interest are those used in detecting and decoding the bar code. Other elements of the signal, typically elements having a low frequency, are filtered out to produce a bar code signal. The bar code signal typically includes only high frequency components resulting from rapid changes in reflected light as the scan beam moves across the light spaces and dark bars of the bar code being scanned.

SUMMARY OF THE INVENTION

The present invention recognizes that the scanner signal produced from the detection of reflected scan pattern light can potentially provide information not only about the bar code, if the bar code contributed to the reflection, but also about the object itself. The scan pattern typically does not only strike the bar code, but also strikes other portions of the object or product carrying that bar code. If properly interpreted, the scanner signal can provide useful information about the object.

A bar code scanner according to one aspect of the present invention comprises a scanning laser beam typically reflected from a rotating mirror to produce a scan pattern emerging from one or more scan windows to strike an object placed in or moving through the field of view of the scanner. The scan pattern typically comprises a number of scan lines, with each scan line being a trace of the scanning laser beam. Upon striking the object, a portion of the light reflected from the scan pattern is reflected back into the scanner where it is collected and used to produce a scanner signal. The scanner signal typically includes low frequency and DC components resulting from diffusively reflected light from the surface of the object. If the scan pattern struck a bar code on the object, the scanner signal will typically also include high frequency components resulting from the reflections from the bars and spaces or other indicia defining the bar code.

The signal is conditioned and may then suitably be split in order to provide a signal to a conventional bar code module used in decoding and interpreting a bar code, and to provide another, identical signal, to a time and space module used to extract timing information from the scanner signal and to interpret the timing information in order to provide spatial information about the object in the field of view of the scanner. The signal at each time point can be mapped to a given position on a scan line, corresponding to a particular scanning beam position in three-dimensional space. Many scan patterns comprise a plurality of scan lines, and each scan line can be a source of information about an object. In addition, many scanners provide two or more scan windows, so that an object may simultaneously intercept scan patterns from each window, thereby providing still more information about the size, shape, position and motion of the object.

A more complete understanding of the present invention, as well as further features and advantages of the invention, will be apparent from the following Detailed Description and the accompanying drawings.

DETAILED DESCRIPTION

Figure 1:
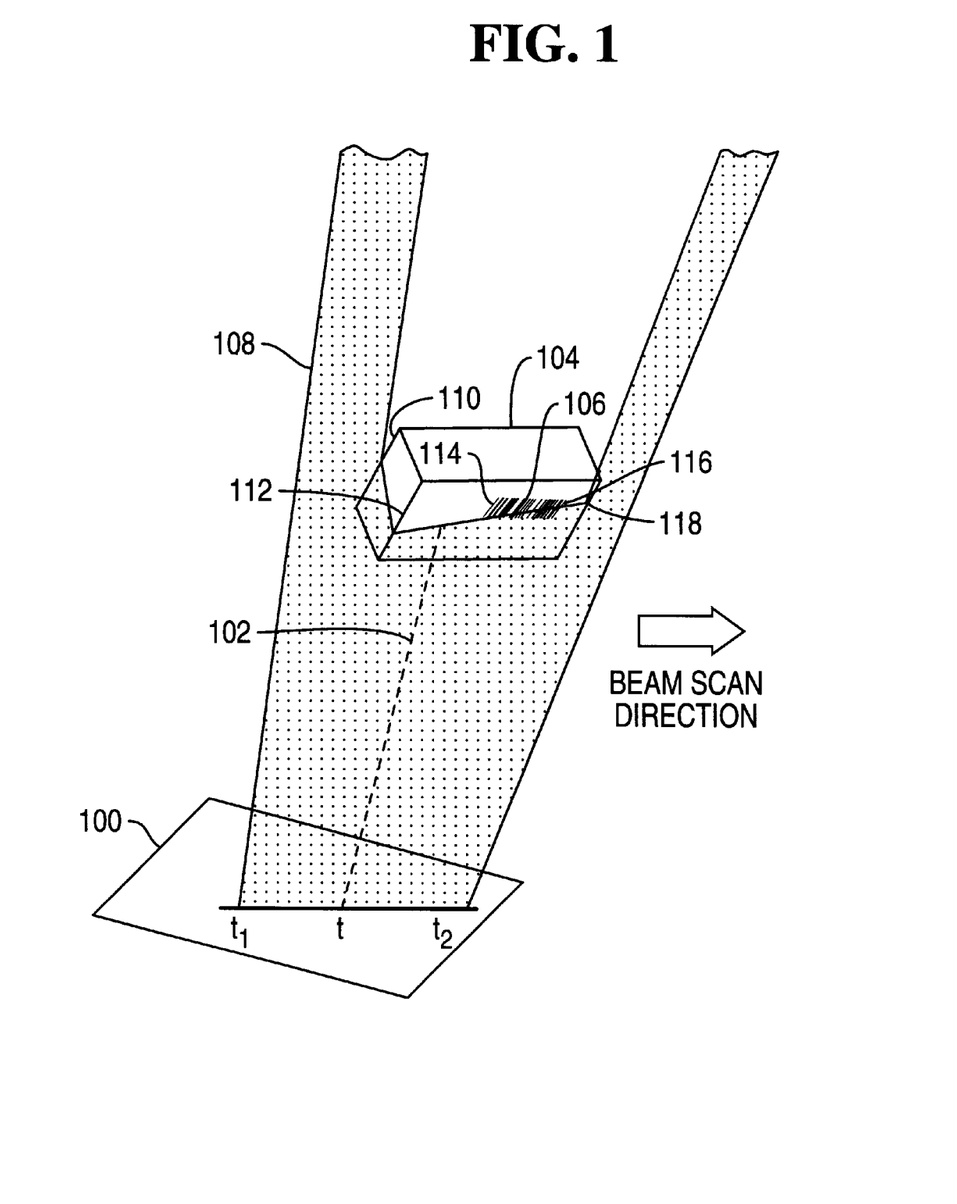
FIG. 1 illustrates a scanner window emitting a scan beam providing imaging information according to the present invention.

FIG. 1 illustrates a scanner window 100 emitting a scanning beam 102, in order to obtain information about an object that may be struck by the scan beam 102. In this case, an object in the form of a white box 104, bearing a bar code 106, is within a scan plane 108 traced out by the scan beam 102 as it travels along the path t from the points t1 to t2. It can be seen that the box 104 interrupts the scan beam 102, causing a break in the scan plane 108. When the box 104 breaks the scan plane 108, light from the reflected scan beam is reflected back into the scanner window 100. Within the portions of the scan plane 108 that are not broken by the box 104, the scan plane 108 extends into space, with no reflection of the scan beam 102 into the scanner window 100. As the scan beam 102 proceeds along the box 104, the intensity of the light reflected back into the scanner 100 changes as a result of features of the box 104. For example, between the points 110 and 112, the scan beam 102 is blocked, and thus reflected, at a point progressively nearer to the scanner window 100. This change in the reflection point causes the intensity of the reflection back into the scanner window 100 to progressively increase, because of the decrease in losses as the reflection occurs at a progressively closer point. These changes occur as the orientation and position of the box 104 causes changes in the way in which the scan beam 102 is obstructed, with significant changes occurring at edges. As the scan beam 102 crosses the bar code 106, a rapid series of changes occurs as the scan beam 102 shifts between the light and dark areas of the bar code 106.

If the location of the scan beam 102 is properly synchronized, the position of the scan beam 102 at each point in time is known or can be calculated. Synchronization may suitably be accomplished, for example, by providing a reference bar code positioned to be struck by the scan beam 102 when a spinner used to produce the scan beam is at a known angular position. After synchronization has occurred, the position of the scan beam 102 may be computed by using a known speed of rotation of the spinner and the angles at which a laser beam strikes the spinner and various mirrors directing the scan beam out of the scanner window 100. If the position of the scan beam 102 can be calculated throughout its travel, the position of the scan beam 102 can be calculated when the scanner signal produced by reflections of the scan beam reveals events of interest. For example, the time at which the scan beam 102 crosses the point 110 is known, and the position of the scan beam 102 as it crosses the point 110 can therefore be calculated. This information is available at all points of interest during the progress of the scan beam 102.

Because the reflections of the scan beam 102 are subject to change during the passage of the scan beam 102 along the box 104, and because the position of the scan beam 102 can be calculated at each point, the changes in the reflections of the scan beam can be mapped against the position of the scan beam in order to obtain useful information. For example, it can be determined whether the scan beam 102 is being reflected at a particular point, when the scan beam 102 starts and stops being reflected, estimated distances from the scanner window 100 of surfaces causing reflection of the scan beam 102, and so on. If information is gathered at each of a large number of points, significant information can be obtained about the box 104, or other objects that may come within the field of view of the scanner window 100. In the present example, significant changes in reflection of the scan beam 102 can be seen to occur as the scan beam 102 passes a first corner 110, second corner 112, leading bar code edge 114, trailing bar code edge 116 and final corner 118 of the box 104. The exemplary embodiment illustrated in FIG. 1 is simplified for ease of illustration, but it will be recognized that a scanner window such as the scanner window 100 typically emits a sequence of scan beams emitted at different angles and tracing out different paths to form a relatively complex scan pattern. An object passing over a scanner window such as the scanner window 100 will typically be struck by scan beams from a variety of different angles.

Figure 2:
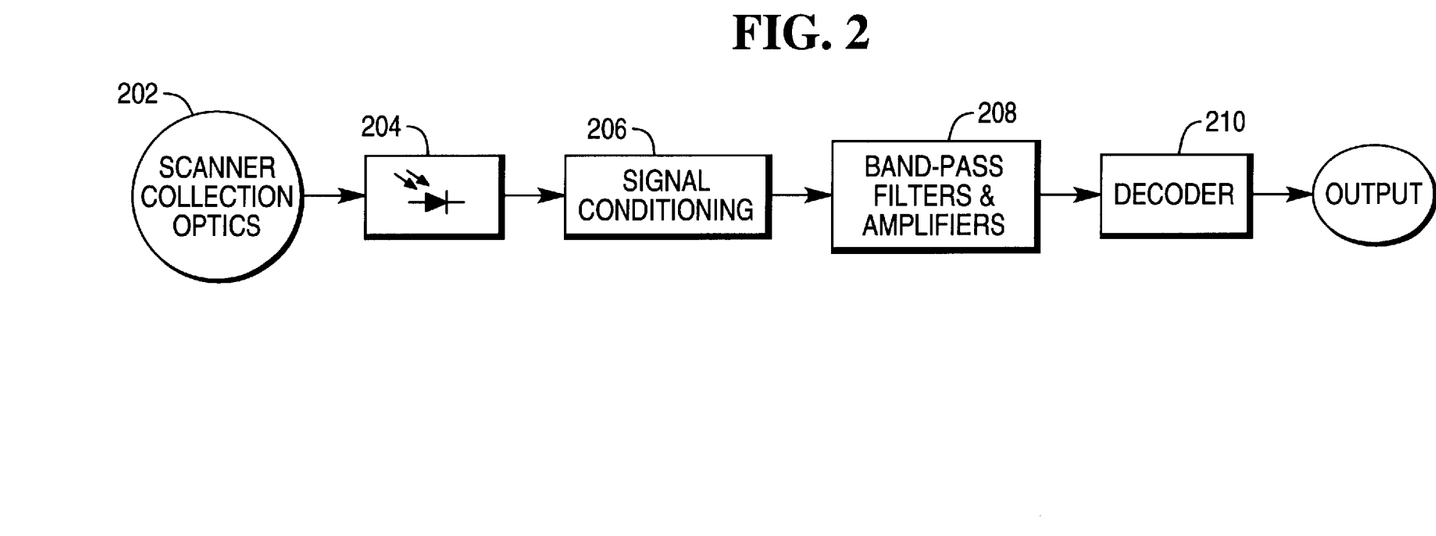
FIG. 2 illustrates scanner components for processing a scan beam in order to obtain signals for use in imaging information estimation and bar code decoding according to the present invention.

FIG. 2 illustrates a functional block diagram of a scanner imaging information and decoding system 200 according to the present invention. The system 200 may suitably receive and process reflections from an object within the field of view of a scanner window such as the scanner window 100 when the object is struck by a scan beam such as the scan beam 102. The system 200 includes scanner collection optics 202 for collecting light reflected into the scanner, a photodiode 204 for sensing the reflected light and producing a photosignal based on the reflected light and a signal conditioning circuit 206 for removing noise and extraneous spikes. The output of the conditioning circuit 206 is a scanner signal, which in the present exemplary embodiment is a DC-coupled signal including DC and low frequency components as discussed below in connection with FIG. 3A. In addition, the system 200 includes a bandpass filter and amplifier circuit 208 in order to isolate the portion of the DC-coupled signal provided by scanning of a bar code such as the bar code 106. The filter and amplifier circuit 208 produces a filtered signal, such as that shown in FIG. 3B which is discussed further below. This filtered signal is supplied to a decoder 210 in order to extract bar code information. The filtered signal provides little information about the size, shape and motion of an object in range of the scanner window 100, because low frequency and DC elements of the signal are filtered out in order to isolate the high frequency elements that are of interest in decoding a bar code. However, the original DC-coupled scanner signal can provide significant information about the object passing within range of the scanner window 100.

Figure 3A:
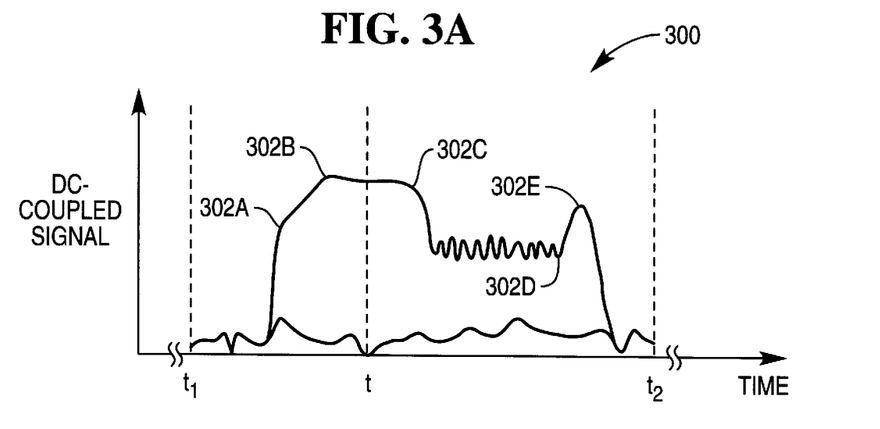
FIG. 3A illustrates a DC-coupled scanner signal produced in response to reflections of a scan beam, the scanner signal being able to be processed to compute imaging information and bar code information according to the present invention.

FIG. 3A illustrates a DC-coupled scanner signal 300, produced by the signal conditioning circuit 206 as a result of collecting and processing reflections of the scan beam 102 as the scan beam 102 passes from the position t1 to t to t2, striking the box 104 and causing reflections therefrom. The signal 300 can be seen to undergo changes corresponding to the positions at which the scan beam 102 strikes the box 104. The point 302A corresponds to the point at which the scan beam 102 passes the first corner 110 of the box 104. The point 302B corresponds to the point at which the scan beam 102 passes the second corner 112 of the box 104. The point 302C corresponds to the point at which the scan beam 102 passes the leading edge 114 of the bar code 106. The point 302D corresponds to the point at which the scan beam 102 passes the trailing edge 116 of the bar code 106. The point 302E corresponds to the point at which the scan beam 102 passes the final corner 118 of the box 104.

It can be seen that the signal 300 undergoes significant changes as the scan beam 102 travels along the path t from t1 to t2. Before the point 302A, the signal 300 is at a very low level because the scan beam 102 travels off into space without being reflected. At the point 302A, the signal 300 rises sharply, indicating that an object is now reflecting the scan beam 102. Between the points 302A and 302B, the scan beam rises steadily, indicating that the scan beam 102 is being reflected back into the scanner window 100 at a closer and closer distance. Between the points 302B and 302C, the signal is at a relatively steady level, indicating that the scan beam 102 is being reflected from a relatively invariant distance. Between the points 302C and 302D, the signal undergoes a great deal of high frequency variation, indicating that the scan beam 102 is crossing the bar code 106. Between the points 302D and 302E, the signal returns to approximately the same level as between the points 302C and 302D, indicating that the scan beam 102 has left the bar code 106 and is being reflected from approximately the same distance as between the points 302C and 302D. Past the point 302E, the signal 200 returns to a low level, indicating that the scan beam 102 has passed the object and is again traveling off into space.

The time at which each of the variations of the signal 300 occurs can be established with a high degree of certainty, and if the motion of the scan beam 102 is properly synchronized, the position of the scan beam 102 at these points can be calculated. By analyzing the variations of the signal 300, noting the time of the variations and mapping the variations against the timing and position of the signal, it is possible to obtain useful information about the object producing the reflections.

Figure 3B:
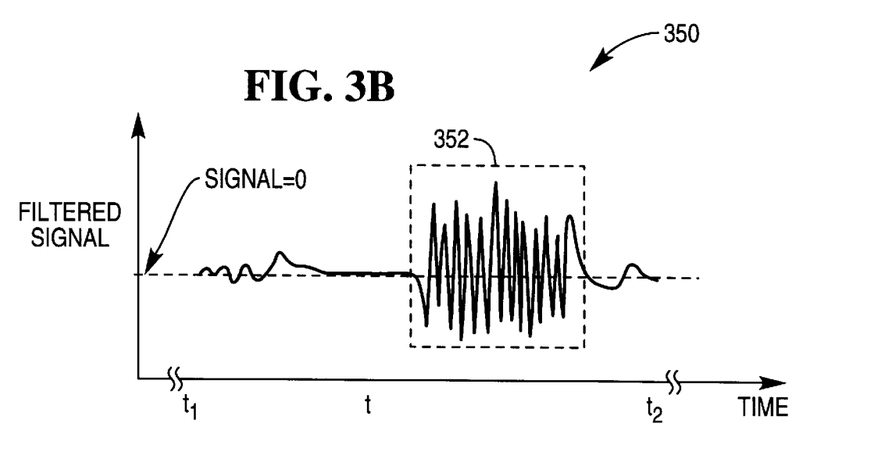
FIG. 3B illustrates a filtered signal from which bar code information can be obtained.

FIG. 3B illustrates a filtered signal 350, produced by the bandpass filter and amplifier circuit 208. It can be seen that the filtered signal 350 is relatively flat except for the region 352, representing the relatively high frequency variation produced by reflections from the bar code signal 106. The filtered signal 350 is used to decode the bar code 106, and represents the DC-coupled signal 300 with DC and low-frequency components filtered out.

As noted above, the DC-coupled signal 300 can be used to identify the time at which events occur. Each change of interest in the DC-coupled signal is likely to represent an event occurring in the scanning of an object, and to establish that the event occurred at a particular time. In order to obtain size, shape and motion information, it is necessary to analyze the timing information, typically in conjunction with known information about the location of the scanning beam at each time throughout one or more scan cycles, in order to derive space information from the timing information.

In order to simplify the process of estimating image information, it is possible to establish a simple hit/no hit criterion, that is, to recognize when a scan beam is striking a relatively nearby object such as an object to be scanned, and when the scan beam is not striking a nearby object but instead is producing little or no reflection entering the scanner. Such lack of reflection occurs, for example, when the scan beam travels unobstructed for a long distance and strikes the ceiling of the room in which a scanner is being operated, producing undetectable or minimal reflections entering the scanner or otherwise travels unobstructed so that any reflections produced by the scan beam are minimal. Establishing a hit/no hit criterion avoids the necessity of closely analyzing the shape of the DC-coupled signal in order to evaluate signal strength and other signal characteristics that may be used to determine how far away an object is from the scan window. Instead, the simple fact that a scan beam is striking an object is recognized and the position of the scan beam when the object is struck is noted. During a typical scan of an object, the object is struck by numerous scan lines emerging from the scanner window at different angles. With a multiwindow scanner, the object may be simultaneously struck by one or more scan lines at pronounced angles to one another. The angles of the scan lines when the striking of the object is detected can be collected and the collected information can be processed using well known geometric principles in order to estimate physical properties of the object, such as size, shape, position, speed of travel and direction of travel.

Figure 4:
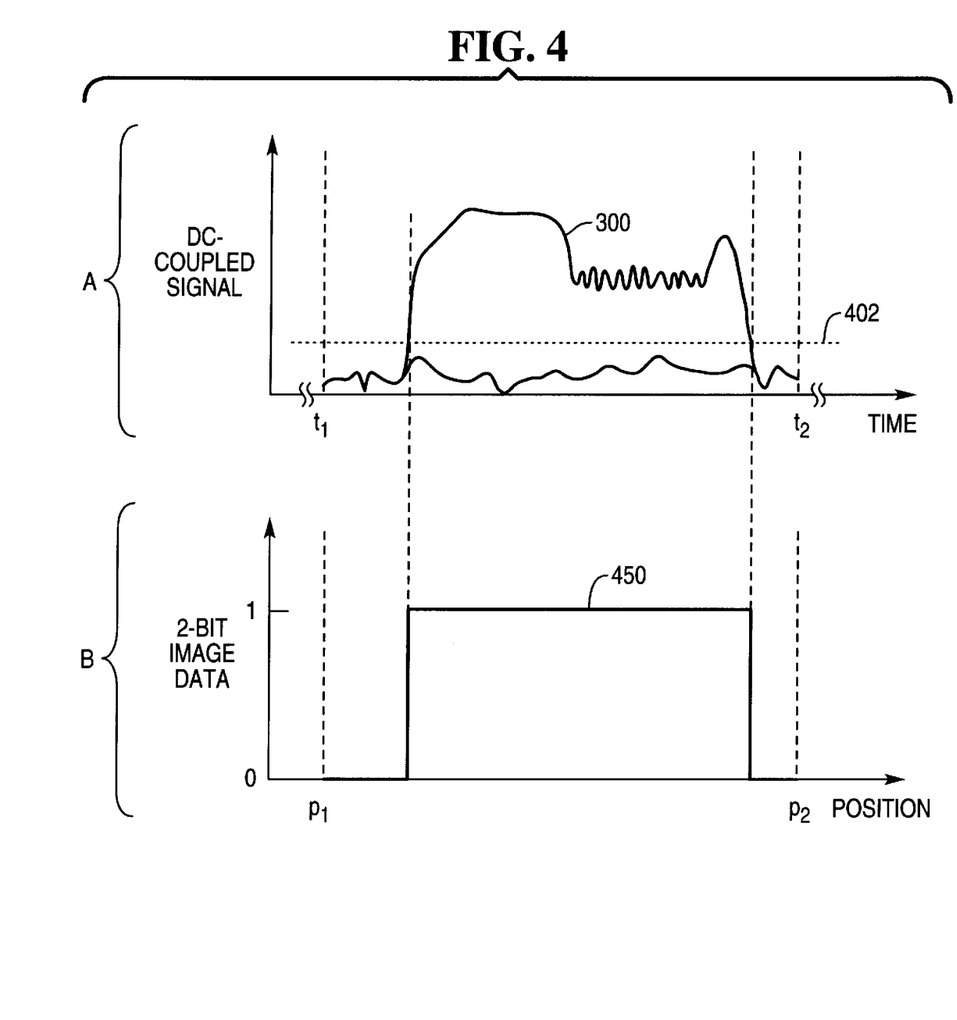
FIG. 4A illustrates a DC-coupled signal scanner signal produced in response to reflections of a scan beam.
FIG. 4B illustrates a hit/no hit signal obtained by subjecting the signal of FIG. 4A to a hit/no hit criterion.

FIGS. 4A and 4B illustrate the use of a hit/no hit criterion to simplify the acquisition of imaging data. FIG. 4A illustrates the DC-coupled signal 300, with a hit-no hit criterion threshold 402 shown. When the amplitude of the DC-coupled signal 300 is above the threshold 402, a hit will be recognized, and when the amplitude of the DC-coupled signal is below the threshold 402, no hit will be recognized. This is illustrated by FIG. 4B, which shows an imaging signal 450, set to a binary "1" when the DC-coupled signal 300 above the threshold 402 and a binary "0" when the DC-coupled signal is below the threshold 402. In the present example, the DC-coupled signal is above the threshold 402 when the box 104 is being struck by the scan beam 102 and is set to a binary "0" and the DC-coupled signal 300 is below the threshold 402 when the box 104 is not being struck by the scan beam 102. The use of a hit/no hit criterion greatly simplifies the process of data analysis, and the analysis of a signal according to a simple hit/no hit criterion can provide considerable information if multiple scan lines are used and the information provided by the scan lines is properly interpreted and processed. Recognition of a hit identifies that the object causing the hit, in this case the box 104, falls within the scan plane traced out by the scan line 102. As multiple scan lines are traced out and the hits produced by the scan lines recorded, the object can be identified as falling within each of a plurality of planar sections. If a large number of scan lines cause recognition of hits, the object will be identified as falling within each of a large number of planar sections. If the number of planar sections is large enough, and the planar sections are at sufficiently different angles to one another, sufficient unique information can be obtained to identify the spatial characteristics of the object with reasonable certainty.

If multiple scanner windows are used, multiple lines can trace over an object at the same time. The recognition of a hit over a scan line traces out a planar section emerging from a scanner window and intersecting the object. If the planar sections are orthogonal to one another, the simultaneous intersection of two planar sections with an object defines the object as falling on a particular line segment. Whatever the angle of the planar sections to one another, in most cases the intersection of two planar sections with an object will produce significantly more information than will the intersection of a single planar sections with an object.

Figure 5:
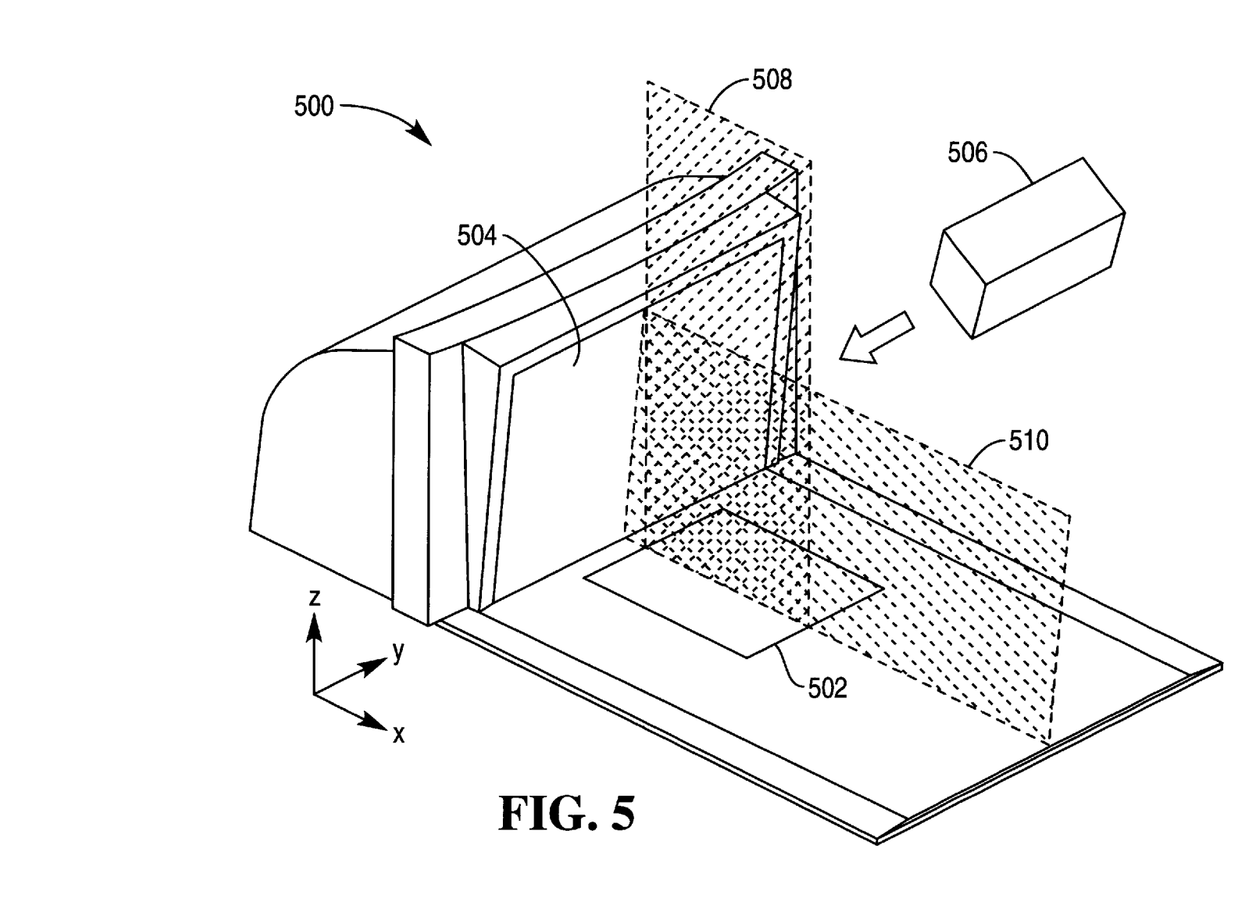
FIG. 5 illustrates a dual window scanner that can be used to obtain imaging information according to the present invention.

FIG. 5 illustrates a scanner 500 having a horizontal scan window 502 and a vertical scan window 504. A box 506 is being passed within range of the scan windows 502 and 504, so that the box 506 will pass through a first plane 508 emitted from the horizontal scan window 502 and a second plane emitted 510 from the vertical scan window 504. The box 506 will simultaneously intersect both scan planes, so that a much closer estimate of the object position can be made than if the box 506 intersected only one scan plane.

Figure 6:
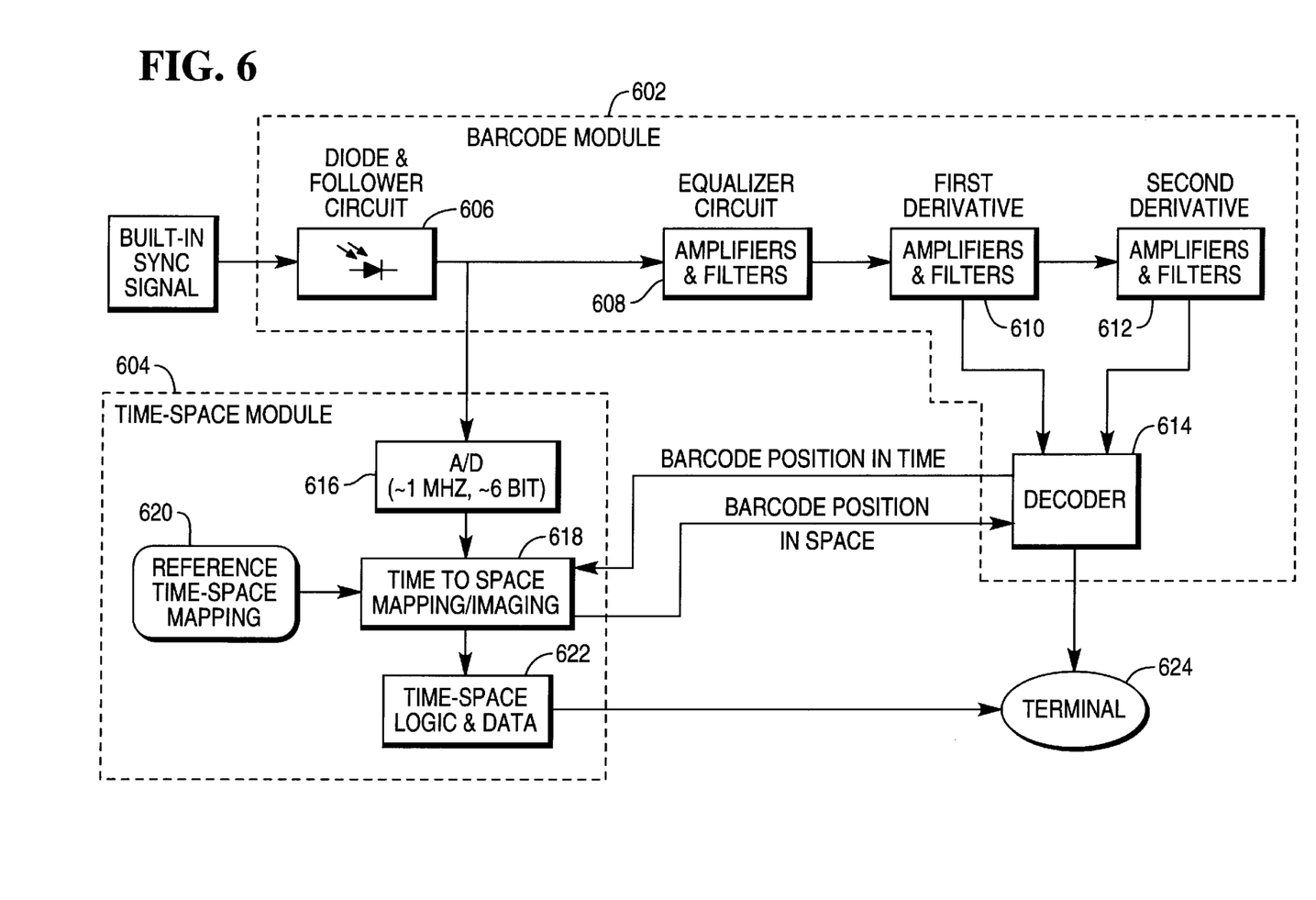
FIG. 6 illustrates schematic components of a scanner providing imaging information and bar code decoding according to the present invention.

FIG. 6 illustrates a schematic diagram of a scanner 600, including a bar code module 602 for decoding a bar code and a time-space module 604 for deriving space and imaging information from the timing information provided by the scanner signal. The bar code module 602 includes a diode and follower circuit 606, which converts light collected by the scanner optics into a photosignal and conditions the photosignal to produce a DC-coupled signal. The DC-coupled signal is passed to an equalizer circuit 608, a first derivative circuit 610 and a second derivative circuit 612, each of which comprises a number of amplifiers and filters for removing DC and low frequency components of the signal. The first derivative circuit 610 provides a first derivative signal to a decoder 614 and the second derivative circuit 612 provides a second derivative signal to the decoder 614. The decoder 614 uses the first and second derivative signals to decode the bar code that reflected the signals. The operation of the decoder 614 and the rest of the bar code module 602 are well known in the art.

The bar code module 602 provides the DC-coupled signal to the time-space module 604. The time-space module 604 includes an analog to digital (A/D) converter 616. The A/D converter 616 may suitably be an 8-bit converter with a speed of approximately 1 MHz, or may be any other suitable A/D converter providing sufficient precision and speed for the expected DC-coupled signal. The A/D converter 616 produces a digital signal that is provided to a time to space mapping and imaging circuit 618. The time to space mapping and imaging circuit 618 retrieves mapping information from a time to space mapping database 620. The time to space mapping database 620 includes angular position information for each time interval in a scan cycle. The mapping and imaging circuit 618 uses the angular position information from the database 620 to identify the angular position of the scan beam or scan beam at the time when the DC-coupled signal shows events of interest. The mapping and imaging circuit 618 uses the angular position information to make estimates of the points in space of the objects or elements of objects causing the events of interest to occur. If, as is typical, the scanner 600 produces a scan pattern producing a number of scan lines and the scan pattern is repeated over a number of cycles as the object passes through the scan volume, sufficient information may be collected to make reasonable estimates about the locations at which various events occurred, by collecting the angular information provided by each scan beam and using all the collected information together to compute the estimates.

In addition to computing image information for the object as a whole, the time and space mapping circuit 618 may also receive timing information from the decoder 614 and use this timing information to compute the position in space of a bar code passing through the scan volume. The decoder 614 provides the mapping circuit 618 with timing information showing when the bar code was detected and the mapping circuit 618 makes an estimate of the spatial position of the bar code by retrieving mapping information from the database 620 and using the mapping information to compute the location. The mapping circuit 618 provides the computed spatial information to the decoder 614. The decoder may use the spatial information to assist in decoding a difficult bar code for which knowledge of the location of the bar code would be helpful in interpreting the signal produced by scanning the bar code. Techniques for the use of spatial information to enhance decoding of bar codes are described in Methods and Apparatus for Using Imaging Information to Improve Scanning Accuracy in Bar Code Scanners, U.S. patent application Ser. No. 10/264,798, filed on even date herewith and having a common assignee to the present invention, and incorporated herein by reference in its entirety.

The mapping circuit 618 provides spatial information to a time space logic and data circuit 622, which computes imaging information describing the size, shape, position and motion of an object using the spatial data computed by the mapping circuit. The logic and data circuit 622 provides the imaging information to a terminal 624. The terminal 624 may use the imaging information in conjunction with bar code information provided by the decoder 614 in order to improve scanning accuracy.

The mapping circuit 618 may suitably employ any of a number of techniques to convert timing information into spatial information. One relatively simple way to obtain information about an object in the scan volume is simply to establish a hit/no-hit criterion and to determine the points at which a hit/no hit criterion is met, that is, the points at which a scan beam such as the scan beam 102 is striking an object or is not striking an object, without attempting to estimate information such as distance of the object from a scanner window such as the scanner window 100. Simply noting whether or not a scan beam is striking an object does not allow for obtaining distance information from a single scan beam and therefore it is impossible to obtain the precise position of an object using a single scan beam interpreted according to a hit/no hit criterion. However, if more than one scan beam is used, and particularly if scan beams are emitted simultaneously from different windows, distance information or position information can be obtained by processing the information provided by the multiple scan beams.

The number of scan lines and the angle at which the scan lines should emerge from the scan window or windows in order to provide imaging information can be determined by analysis of the geometry of the scan lines needed to produce the desired information given the characteristics of the particular scanner used. For a scanner with two scan windows, one window should preferably be at or near a 90 degree angle with the other window and at least two subgroups of scan lines, one subgroup from each window, should form approximately plane parallel pairs, with the distance between the planar sections traced out by each subgroup of scan lines being compatible with the desired spatial resolution. Each scan window should have at least two subgroups of scan lines, with the scanning beam for all scan lines within a subgroup being approximately parallel for each scan line within the subgroup. The scan lines within one subgroup should be approximately orthogonal to those within a second subgroup.

Many presently used scanners have these characteristics, so that the only requirements for collecting imaging information are to select the scan lines to be used to gather imaging information, to allow the required signal components produced by the reflections produced by these scan lines to be received and processed, and to perform the time and space analysis required to estimate imaging information using the information provided by these scan lines.

In order to remove the effects of ambient noise and other phenomena that may produce spurious or irrelevant information, the time-space module 604 may suitably be designed or programmed so that it does not process signal information directly. Instead, the time-space module 604 may compute and process difference information representing the differences between consecutive scan cycles over a predetermined time interval. The length of the time interval may suitably be determined based on the speed range of objects expected to move through the scan cycle and the length of the scan cycle. Constant conditions or conditions that do not change significantly during the relevant time interval will not be present in the difference information because these conditions will not cause differences from one scan cycle to the next. The scanner signals may be compared over consecutive scan cycles and used to construct a difference signal.

If the length of the scan cycle is T, the reference time point for the previous i-th cycle is $t_i$, and the index for the current cycle is 0, then the signal for the previous i-th cycle may be defined as $S_i(\Delta t)=S(t-t_i)$, where $t_i \leq t < t_i+T$. The difference signal between the current cycle and the previous i-th cycle and j-th cycle is defined as $D_{ij}(\Delta t)=S_i(\Delta t)-S_j(\Delta t)$. If an object enters a scan volume just after the j-th cycle, the signal of the j-th cycle measures the background, that is, the ambient conditions with no object present. The function $D_{ij}(\Delta t)$ where $j<i\leq 0$ then tracks the image of the object during the time interval $t_j+1<t<t_0+T$, where $t_0+T$ is the ending time of the current cycle.

The use of the difference signal helps to minimize a number of potential problems. For example, if the ambient light is very strong, such as when the scanner window is exposed to ceiling lights, the background signal may be much stronger than the signal caused by reflection of the scan beam. In such a case, the difference signal may be negative, complicating efforts to properly interpret the different signal when a hit/no hit criterion is used. Using the absolute amplitude of the difference signal helps to prevent problems in interpretation, because using the absolute amplitude insures that a positive signal will be used for interpretation. Using the difference signal helps to remove slow variations in background light, such as are caused by movements of people around the area of the scanner. If background light is supplied by fluorescent lights, the normal 60-Hz power supply will cause 120-Hz fluctuations in the lights. These fluctuations are too fast to be removed by using the difference signal, but except when they are scanned directly, they are typically of sufficiently low amplitude that they will not significantly affect imaging data. In addition, such signal variations are predictable and the time-space module 604 can be programmed to compensate for the variations in cases where fluorescent lights are positioned such that the ambient light they produce significantly affects the signal.

The use of a difference signal provides significant advantages in dealing with objects having unusual surface reflectivities. If an object being scanned is optically dark at the wavelength of the laser producing the scan beam, the signal level produced by a reflection of the scan beam will be near zero. In such a case, no hit would be recognized as a result a signal produced by reflection of the scan beam. However, even a dark object will produce differences between the signal without the object present and the signal with the object present. For example, if a dark object passes over the scanner window, it will block ambient light and result in a signal level lower than would ordinarily be expected, and one that differs from a normalization signal. Subtracting the signal prevailing when the object was in the scan volume from the signal prevailing in the absence of the object would produce a negative difference signal following the motion of the object. Taking the absolute value of the negative difference signal would produce a difference signal from which the characteristics of the object could be estimated.

It is possible to use the function $D_{i(i-1)}(\Delta t)$ to trace the movement of an object. For example, a bi-optic scanner with a spinner speed of 8000 rpm has a cycle length T=7.5 ms. If an object is moving at 50 inches per second through a scan volume 4 inches wide, the object takes at least 80 ms, or the length of approximately 10 consecutive scan cycles, to move through the scan volume. The difference signal computed over these 10 scan cycles provides information about the relative path of the object. The difference signal will be based on approximately 10 sets of scan lines, and will provide a significant amount of unique information.

In order to compensate for variations in optical collection efficiency, a scanner may suitably employ a reference signal obtained by scanning an object chosen to generate a signal that can be used for signal normalization. The object may suitably be a white or gray screen near the point at which scan lines emerge from the scanner window. The signal obtained by scanning actual objects may therefore be a normalized signal expressed in terms of the reference signal. If the reference signal is expressed as $R(\Delta t)$, the normalized signal may be expressed as $S_i^N(\Delta t)=S_i(\Delta t)/R(\Delta t)$. If desired, the reference signal may be measured under a controlled environment and stored within the time-space module 604. If a difference signal is used, it is normalized in the same way.

Figure 7:
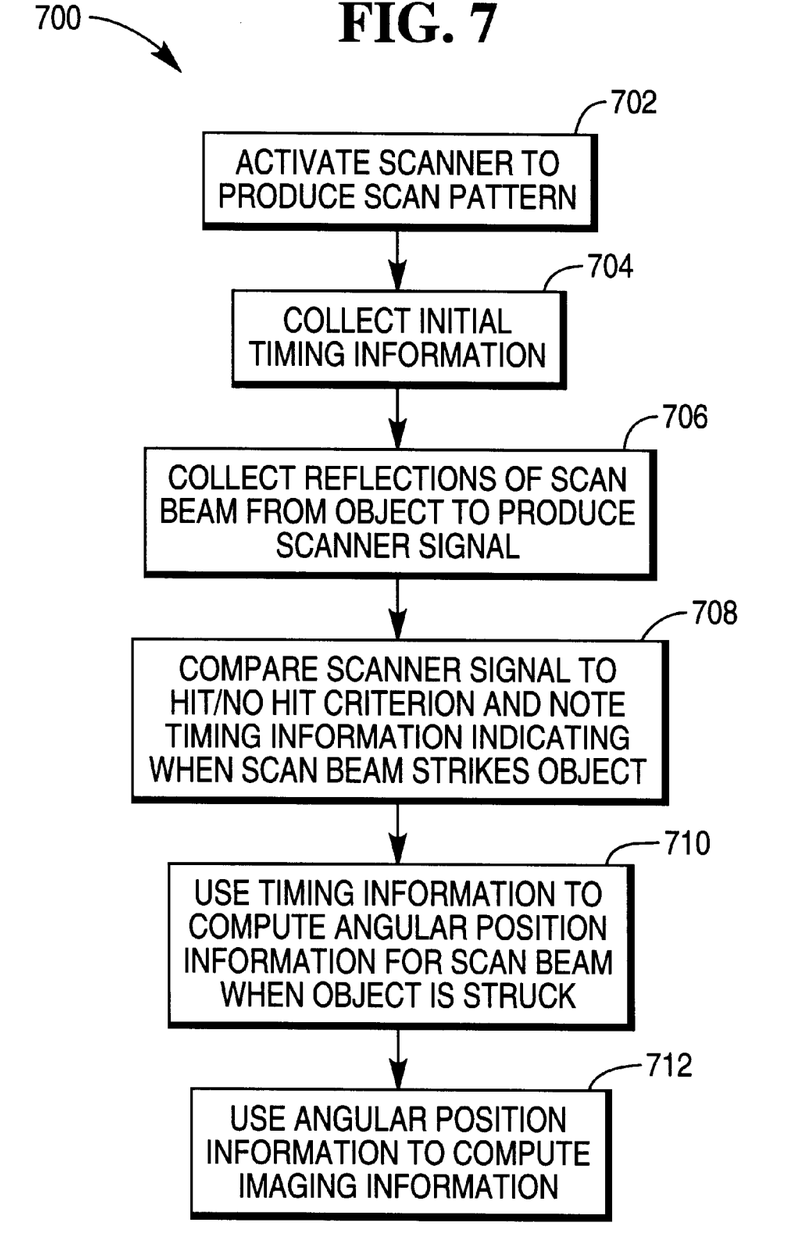
FIG. 7 illustrates a process for computing imaging information and decoding bar codes according to the present invention.

FIG. 7 illustrates a process 700 of image estimation according to an aspect of the present invention. At step 702, a scanner is activated to produce a scan pattern comprising a sequence of scan beams emerging from a scan window and sweeping over a path. At step 704, timing information is collected when a scan beam crosses a synchronization label, suitably over two or more consecutive scan cycles. Each time the scan beam crosses the synchronization label, a characteristic signal is produced and the time at which the signal occurs can be noted. Receiving two consecutive synchronization signals and noting the time at which each of them occurs allows accurate computation of a spinner used to produce a scan pattern. At step 706, whenever an object is brought within range of one or more scan beams making up the scan pattern so that one or more scan beams strikes the object, reflections from the scan beams reentering the scan window are collected to produce a scanner signal, suitably comprising a DC-coupled signal. The scanner signal may suitably be normalized or converted to a difference signal in order to remove the effects of ambient conditions or to increase the usefulness of the signal. Simultaneously, the DC-coupled signal is filtered to produce a filtered signal used for decoding a bar code.

At step 708, the DC-coupled signal produced by each reflection is compared to a hit/no hit criterion to determine if and at what times a particular scan beam strikes the object. Whenever the comparison of the DC-coupled signal with the hit/no hit criterion shows that the object is struck by a scan beam, the time at which the object is struck is noted. At step 710, the angular position or range of angular positions of each scan beam striking the object is computed from the time information noted at step 708. At step 712, the angular position information for the scan beams is used to estimate imaging information about the object, such as the size, shape and position of the object, as well as any movement of the object.

While the present invention is disclosed in the context of a presently preferred embodiment, it will be recognized that a wide variety of implementations may be employed by persons of ordinary skill in the art consistent with the above discussion and the claims which follow below.

We claim:

1. A bar code scanner comprising:

a scan window;

a laser source for producing a scan beam emerging from the scan window and striking an object within range of the scan window to produce reflections from the scan beam off of the object, a portion of the reflections comprising light reentering the scan window;

collection optics for collecting the light reentering the scan window;

a photodetector for producing a photosignal based on the light collected by the collection optics;

a time space module for processing the signal to estimate imaging information relating to the object producing the reflections, the time space module being operative to note a time at which the signal indicates that an event of interest has occurred, the time space module being further operative to note a position of the scan beam at the time an event of interest has occurred and to employ the information provided by the timing of events and the position of the scan beam at the occurrence of events to estimate imaging information relating to the object.

2. The scanner of claim 1 wherein the photosignal is subjected to a hit/no hit criterion to create a hit/no hit signal indicating whether the object is being struck by the scan beam and the hit/no hit signal is set to a first level when an object is struck by the scan beam and a second level when the object is not struck by the scan beam.

3. The scanner of claim 2 wherein the scan beam traces through a scan pattern comprising a plurality of scan lines emerging from the scan window at each of a variety of different angles and wherein the photosignal and the hit/no hit signal indicate multiple reflections from an object when scan lines strike the object from different angles as the scan beam traces through the scan pattern.

4. The scanner of claim 3 wherein, the photosignal is normalized by comparing it to a reference signal created by a reflection from a standardized surface.

5. The scanner of claim 4 wherein the photosignal is collected over several scan cycles, each scan cycle comprising a repetition of the scan pattern.

6. The scanner of claim 5 wherein the photosignal is processed to create a difference signal comprising a difference between the photosignal produced during each scan cycle and the photosignal produced during an immediately previous scan cycle.

7. The scanner of claim 6 wherein the difference signal is processed using a hit/no hit criterion to produce a hit/no hit difference signal.

8. A bar code scanner comprising:

a first scan window;

a first laser source for producing a first scan beam emerging from the first scan window and striking an object within range of the first scan window to produce reflections from the first scan beam off of the object, a portion of the reflections comprising light reentering the first scan window;

a first set of collection optics for collecting the light reentering the scan window;

a first photodetector for producing a first photosignal based on the light collected by the first set of collection optics;

a second scan window;

a second laser source for producing a second scan beam emerging from the second scan window and striking an object within range of the second scan window to produce reflections from the second scan beam off of the object, a portion of the reflections comprising light reentering the second scan window;

a first set of collection optics for collecting the light reentering the scan window;

a first photodetector for producing a first photosignal based on the light collected by the first set of collection optics;

a time space module for processing the first and second photosignals to estimate imaging information relating to the object producing the reflections, the time space module being operative to note a time at which each photosignal indicates that an event of interest has occurred, the time space module being further operative to note a position of the first scan beam at the time the first photosignal indicates that an event of interest has occurred and to note a position of the second scan beam at the time the second photosignal indicates that an event of interest has occurred and to employ the information provided by the timing of events and the position of the first and second scan beams at the occurrence of events to estimate imaging information relating to the object.

9. The scanner of claim 8 wherein the first photosignal is subjected to a hit/no hit criterion to create a first hit/no hit signal indicating whether the object is being struck by the first scan beam and the hit/no hit signal is set to a first level when an object is struck by the first scan beam and a second level when the object is not struck by the first scan beam, and wherein the second photosignal is subjected to a hit/no hit criterion to create a second hit/no hit signal indicating whether the object is being struck by the second scan beam and the hit/no hit signal is set to a first level when an object is struck by the scan beam and a second level when the object is not struck by the second scan beam.

10. The scanner of claim 9 wherein the time space module identifies times when the first and second scan beams strike the object nearly simultaneously and uses the position of the scan beams at the time of simultaneous striking of the object to estimate imaging information.

11. The scanner of claim 10 wherein the first scan window is at an angle of approximately 90 degrees with the second scan window.

12. The scanner of claim 11 wherein each of the first and second scan beam traces through a scan pattern comprising a plurality of scan lines emerging from the scan window at each of a variety of different angles and wherein the photosignal and the hit/no hit signal indicate multiple reflections from an object when scan lines strike the object from different angles as a scan beam traces through the scan pattern.

13. The scanner of claim 12 wherein each of the first and second scan patterns comprises at least two subgroups of scan lines, each subgroup comprising at least two scan lines approximately parallel to one another.

14. The scanner of claim 13 wherein each of the first and second scan patterns includes at least two subgroups approximately orthogonal to one another.

15. A method of image estimation for a bar code scanner, comprising the steps of:

emitting a scan beam from a scanner window to strike an object within range of the scan window in order to cause reflections from the object into the scan window;

collecting the reflections from the object into the scan window;

producing a scanner signal based on the reflections, the scanner signal indicating when the scan beam is or is not striking the object;

noting timing information indicating the times when the scanner signal indicates that the scan beam is striking the object;

using the timing information to determine the position of the scan beam when the scanner signal indicates that the scan beam is striking the object; and estimating imaging information relating to the object based on the position of the scan beam at the times when the scan beam is striking the object.

16. The method of claim 15, wherein the scanner signal is a DC-coupled signal including low frequency components.

17. The method of claim 16, wherein the scanner signal is produced by processing a photosignal based on reflections of the scan beam from the object and the scanner signal is a difference signal based on differences in the photosignal over successive scan cycles.

* * * * *